Oct. 21, 1941.   E. A. WETZEL   2,260,129
SEALING STRIP
Filed May 10, 1939
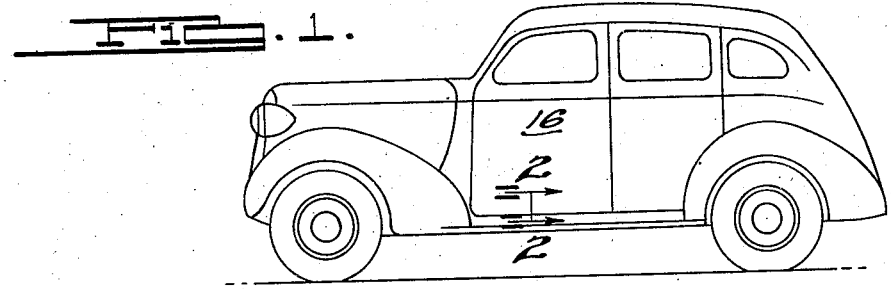
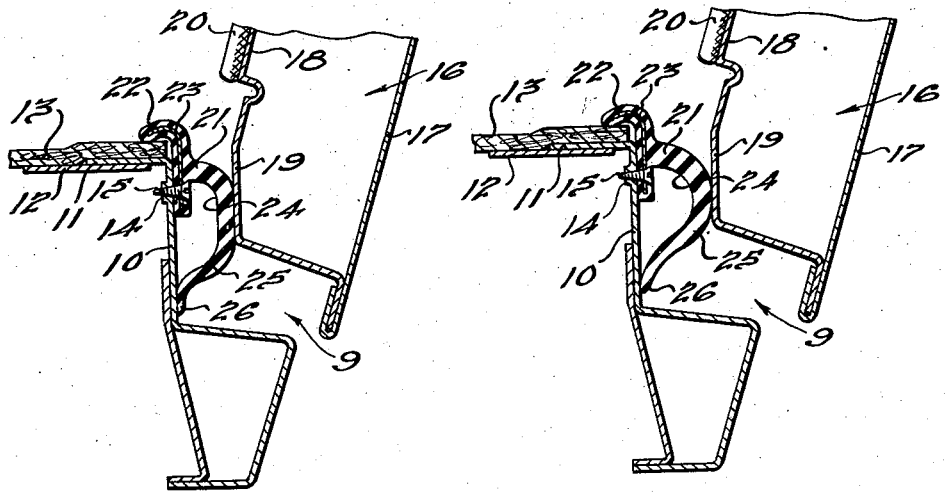
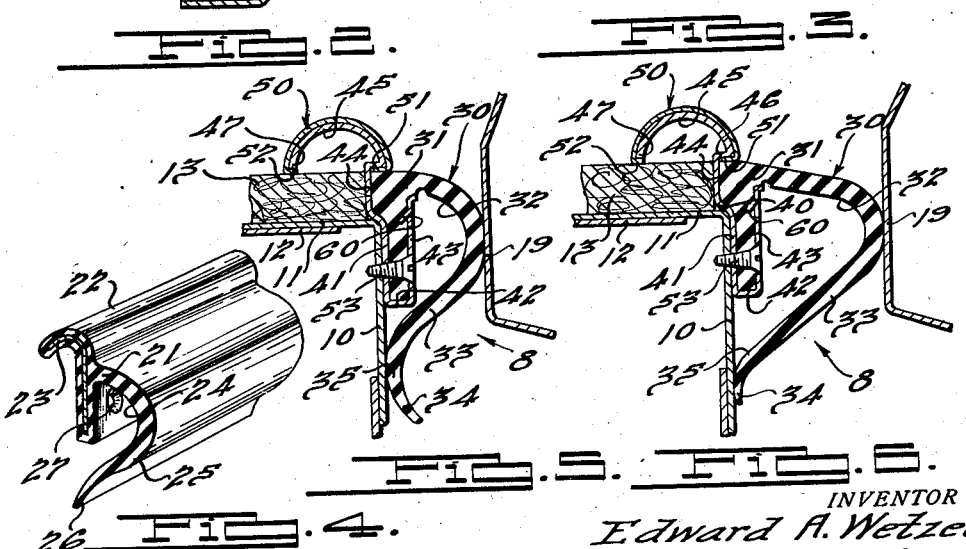
INVENTOR
Edward A. Wetzel.
BY Dike, Calver & Gray
ATTORNEY Patented Oct. 21, 1941

2,260,129

UNITED STATES PATENT OFFICE 2,260,129

SEALING STRIP

Edward A. Wetzel, Detroit, Mich., assignor to Briggs Manufacturing Company, Detroit, Mich., a corporation of Michigan Application May 10, 1939, Serial No. 272,866

7 Claims. (Cl. 296—44)

This invention relates to sealing means or strips for doors, such as the doors of vehicle bodies, and particularly to sealing strips useful for effecting a relatively tight closure along the bottoms of doors of motor vehicle bodies. The present application is a continuation-in-part of my co-pending application Serial No. 138,711, filed April 24, 1937, Patent No. 2,158,808, May 16, 1939.

An object of the invention is to provide inexpensive and effective sealing means for the joint or space between the lower or bottom portion of the vehicle body door and the adjacent vehicle body frame or floor sill.

Another object of the invention is to provide novel sealing means capable of being attached directly to a frame member of the vehicle body.

Another object is to provide flexible sealing means capable of sealing spaces of varying depths so as to compensate for variations in the fitting of the doors.

A further object of the invention is to provide sealing means of the foregoing character capable of providing, in effect, a recess or pocket for receiving the edge of the floor covering adjacent the sill of the vehicle floor and maintaining said covering in smooth condition at the door opening of the body.

Another object of the invention is to provide flexible sealing means of the foregoing character having relatively rigid or stiff reinforcing means for attaching the sealing element to the vehicle body.

A further object of the invention is to provide improved sealing means for the joint or space between the lower portion of a vehicle door and the adjacent portion of the vehicle body which is of composite construction capable of being removably attached to the body.

Another object is to provide a device for sealing the joint between a vehicle body member and the lower end of the vehicle door in which the device comprises a relatively stiff though flexible rubber sealing strip and a metallic supporting and attaching member for the strip.

A further object is to provide a sealing device of composite structure in which the supporting and attaching member for the flexible sealing strip also provides a scuff plate for the door sill or similar member of the vehicle body.

A further object of the present invention is to provide composite sealing means of the foregoing character in which the several parts thereof may be easily and quickly assembled and applied to the vehicle body.

The above and other objects of the invention will appear from the following description and appended claims when considered in connection with the accompanying drawing forming a part of this specification wherein like reference characters designate corresponding parts in the several views.

In said drawing:

Fig. 1 is a side elevation of an automobile equipped with sealing means in accordance with the invention.

Fig. 2 is a vertical section, on an enlarged scale, taken substantially along the line 2—2 of Fig. 1, looking in the direction of the arrows, with the door in fully closed position.

Fig. 3 is a view similar to Fig. 2 but showing the vehicle door at its initial point of contact with the sealing means.

Fig. 4 is a fragmentary perspective view of the sealing means or strip of Figs. 2 and 3.

Fig. 5 is a view similar to Fig. 2 showing a somewhat modified form of sealing means embodying the invention, with the door in fully closed position; and Fig. 6 is a view similar to Fig. 5 but showing the vehicle door at its initial point of contact with the sealing means.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figs. 2, 3 and 4 of the drawing, wherein one form of sealing means embodying the present invention is shown, 10 represents a longitudinal body frame member provided with a substantially horizontal inwardly directed flange 11 overlying the floor member or plate 12. The floor, in the present instance, is formed of metal and is provided with a conventional covering 13. The vertical leg or web of the member 10, as shown, is provided at predetermined spaced points with holes 14 adapted to receive screws 15, as hereinafter referred to. The door in the present instance is shown as a whole at 16 and has an outer panel 17 and an inner panel 18 provided with a lower extension 19 and an upholstered finish sheet or trim panel 20. In the present instance, the sealing means or device is preferably in the form of a strip of elastic or resilient rubber material which is relatively flexible. It comprises, as shown, a body portion 21 having an upwardly and inwardly curved flange or portion 22, the body and flange being reinforced by a similarly shaped metal strip or plate 23 which is embedded therein. The body portion 21 of the sealing strip has an outwardly and downwardly flared sealing portion 24 and an integral inwardly and downwardly flared portion or extension 25 terminating in a lip or edge portion 26. The portion 24 is preferably somewhat stiffer than the portions 25 and 26 of the sealing strip to provide a set convex portion, bulge or protuberance which, when engaged by the portion 19 of the door, is flattened and placed under compression, see Fig. 2, with the portion 26 being pressed into intimate engagement with the adjacent portion of the frame member or sill 10 so as to close the space 9 between the door 16 and the frame member.

The sealing strip of Fig. 2 is attached to the body frame member 10 by means of the screws 15 which pass through holes 27 (see Fig. 4) formed in the body portion of the rubber strip and in the reinforcing metal strip or plate 23, thence passing through the holes 14 formed in the member 10. When thus installed, the portions 25 and 26 are flexed out slightly so as to be held under tension snugly against the sill when the door is in open position, or when the door is in the position in which it is shown in Fig. 3, namely at its initial point of contact with the sealing means. The upper inwardly curved reinforced end 22 of the sealing strip or device overlies and engages the floor covering 13, thus providing with the flange 11, a recess or pocket for receiving the edge of said floor covering and maintaining it in smooth condition at the door opening of the body. When the door 16 is in closed position as seen in Fig. 2, ingress of air and moisture into the body of the vehicle is prevented.

In Figs. 5 and 6, there is shown a somewhat modified form of composite sealing means or device embodying the present invention. In this form the sealing member or strip, shown as a whole at 30, comprises a body portion 31, an outwardly and downwardly flared sealing portion 32 and an integral inwardly and downwardly flared portion or extension 33 terminating in a lip or edge portion 34. As in the preceding form of the invention, the portion 32 of the strip is somewhat stiffer than the portions 33 and 34 thereof to provide a set convex portion, bulge or protuberance which, when engaged by the portion 19 of the door, is flattened and pressed under compression, see Fig. 5 with the portion 35 of the strip adjacent the lip 34 being pressed into intimate engagement with the adjacent portion of the frame member or sill 10 so as to seal the space 8 between the door and the adjacent frame member 10.

The sealing device 30 of the present form of the invention also comprises a metallic substantially U-shaped or channel-like metal strip, shown as a whole at 40. The member 40 comprises a back wall 41, a base portion 42 and a front wall 43. The back or inner wall 41 is extended upwardly at 44 and terminates in a crown-shaped bead or retainer portion 45 forming in effect a scuff plate. The wall extension 44 is flanged or bent outwardly at 46 so as to provide an overhanging portion above the socket or pocket provided between the front or outer wall 43 and the inner or back wall 41. The flange 46 and the free edge 47 of the portion 45 together provide means for receiving and supporting the inturned flanges 51 and 52 of a crowned finish plate or member shown as a whole at 50. This finish plate may be chromium plated or lacquered and serves to provide an ornamental scuff plate or strip which extends throughout the width of the door opening in the body. The finish strip 50 may be applied to the crowned portion 45 of the sealing device by telescoping it over the portion 45, or the flange 51 may be hooked over the flange 46 and the other flange snapped into place over the free edge 47 of the crowned member 45 so as to hold the parts together.

In assembling the device the body portion 31 of the sealing strip proper is inserted in the socket or pocket formed between the walls 41 and 43 of the metallic supporting and attaching member. It will be noted that the body portion 31 is enlarged to fit snugly within the space adjacent the extension 44 of the metallic member. After the rubber body portion 31 has been assembled with the metal supporting member, screws 53 are passed through aligned holes in the walls 43 and 41 and into holes or openings formed in the frame member or sill 10 to lock the rubber portion of the sealing device in place and to secure the whole device to the face of the frame member. When applied to the car body it will be seen that the crowned portions 45, 50, overlie and engage the floor covering 13, thus providing with the flange 11, a recess or pocket for receiving the edge of the floor covering and maintaining it in smooth condition at the door opening of the body. As in the previous form of the invention, when the door is closed as seen in Fig. 5, ingress of air and moisture into the body of the vehicle is prevented.

In Fig. 6 there is illustrated the position of the parts when the door portion 19 is at its initial point of contact with the sealing member 30. In this position it will be seen that the lip portion 34 of the sealing device is in intimate contact with the adjacent face of the frame member 10.

If desired, the front wall 43 of the supporting and attaching portion of the sealing means may be provided at spaced points with tongues or lugs 60 struck inwardly from the metal of the wall and which embed themselves in the body portion 31 of the rubber strip to assist in maintaining the rubber strip in place.

It will be understood that the metal of the retaining and supporting device is of a character having sufficient flexibility to permit the front wall 43 thereof to be bent outwardly to receive the body portion of the rubber strip and which will then assume the shape or form shown in Figs. 5 and 6 upon the application of the attaching screws 53.

I claim:

1. In a vehicle body having a floor, floor covering, a sill and a door, a sealing strip formed of yieldable material having a body portion provided therein with a metal reinforcing strip, said body having an upright portion secured to the upright outer face of the sill and an inwardly curved upper end portion overlying the sill and spaced therefrom to receive therebetween the edge of the floor covering, and a flexible sealing portion projecting outwardly from said upright body portion and curved downwardly and inwardly toward said sill, said sealing portion engaged by the door and compressed between the door and sill when said door is in closed position.

2. In a vehicle body having a floor, floor covering, a sill and a door, a sealing strip formed of yieldable material having a body portion provided therein with a metal reinforcing strip, said body having an upright portion secured to the upright outer face of the sill and an inwardly curved upper end portion overlying the sill and spaced therefrom to receive therebetween the edge of the floor covering, a flexible sealing portion projecting outwardly from said upright body portion and curved downwardly and inwardly toward said sill, said sealing portion engaged by the door and compressed between the door and sill when said door is in closed position, and means for attaching the sealing strip to the body sill.

3. A rubber sealing strip for sealing the joint between a vehicle body sill and door, comprising a substantially vertical body portion, a reinforcing metal strip embedded in said body portion and providing means for attaching the sealing strip to an upright portion of a body sill, and a flexible sealing portion integral with and projecting from said body portion, said metal strip at its upper end being extended laterally to provide a portion adapted to overlie a floor covering.

4. In a vehicle body having a floor, floor covering, a sill and a door, a sealing strip formed of resilient material having a body portion provided with a metal reinforcing strip embedded therein, said body having an upright portion secured to the upright outer face of the sill and an inwardly curved upper end portion overlying the sill and spaced therefrom to receive therebetween the edge of the floor covering, and a flexible sealing portion projecting outwardly from said upright body portion and curved downwardly and inwardly toward said sill, said sealing portion being engageable by the door.

5. The combination with a vehicle body having a floor, floor covering, a sill and a door, of a sealing strip formed of compressible material having a body portion provided with a metal reinforcing strip embedded therein, said body having an upright portion secured to the upright outer face of the sill and an inwardly curved upper end portion overlying the sill and spaced therefrom to receive therebetween the edge of the floor covering, a flexible sealing portion projecting outwardly from said upright body portion and curved downwardly and inwardly toward said sill, said sealing portion being engaged by the door and compressed between the door and sill when said door is in closed position, and means for attaching the sealing strip to the body sill.

6. Means for sealing the joint between a vehicle body frame portion and a door, comprising an elongated rubber sealing strip having a body portion, an outwardly and downwardly flaring portion, a flexible sealing portion integral with and projecting inwardly and downwardly from said last named portion and terminating in a lip, and an elongated metal member embedded in said sealing strip and providing means for attaching the strip to the body frame portion, said metal member having a crowned portion adapted to overlie the body frame portion when the strip is attached to said frame.

7. A vehicle body scuff or sill plate comprising a metallic member having a flange adapted to be disposed generally horizontally in a door opening so as to overlie the sill and also having a depending flange integral with the aforesaid flange and a resilient door sealing strip having a portion coextensive with said metallic member, the latter being embedded in said sealing strip and the sealing strip having an outwardly and downwardly flaring portion adapted to be engaged by a door.

EDWARD A. WETZEL.